United States Patent
Koutrika

(10) Patent No.: US 9,286,408 B2
(45) Date of Patent: Mar. 15, 2016

(54) ANALYZING UNIFORM RESOURCE LOCATORS

(71) Applicant: Hewlett-Packard Development Company, L.P., Houston, TX (US)

(72) Inventor: Georgia Koutrika, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 13/754,048

(22) Filed: Jan. 30, 2013

(65) Prior Publication Data

US 2014/0214788 A1 Jul. 31, 2014

(51) Int. Cl.
*G06F 7/00* (2006.01)
*G06F 17/30* (2006.01)
*G06F 17/27* (2006.01)
*G06F 17/24* (2006.01)

(52) U.S. Cl.
CPC ........ *G06F 17/30887* (2013.01); *G06F 17/241* (2013.01); *G06F 17/27* (2013.01)

(58) Field of Classification Search
CPC ............................ G06F 17/241; G06F 17/3082
USPC ................. 707/749, 755, 708; 704/7
See application file for complete search history.

(56) References Cited

U.S. PATENT DOCUMENTS

| | | | |
|---|---|---|---|
| 6,882,970 B1* | 4/2005 | Garner et al. ................. | 704/236 |
| 7,921,226 B2 | 4/2011 | Mukherjee et al. | |
| 2003/0187956 A1 | 10/2003 | Belt et al. | |
| 2007/0130151 A1* | 6/2007 | Wiles .............................. | 707/10 |
| 2009/0094137 A1 | 4/2009 | Toppenberg et al. | |
| 2011/0040769 A1* | 2/2011 | Tseng et al. .................. | 707/750 |
| 2011/0258054 A1* | 10/2011 | Pandey et al. .............. | 705/14.72 |

FOREIGN PATENT DOCUMENTS

CN 101520798 A 9/2009
KR 20080082023 9/2008

OTHER PUBLICATIONS

M. Chen, et al. "Predicting Category Accesses for a User in a Structured Information Space", (Research Paper), Proceedings of the 25th Annual International Conference on Research and Developement in Information Retrieval, Aug. 11-15, 2002, pp. 65-72.

* cited by examiner

*Primary Examiner* — Cheyne D Ly
(74) *Attorney, Agent, or Firm* — Dicke, Billig & Czaja, PLLC

(57) ABSTRACT

Methods for analyzing a Uniform Resource Locator (URL) and apparatus for performing such methods. The methods include parsing the URL into text segments and generating n-grams from the text segments. The methods further include generating annotations, each annotation corresponding to one of the n-grams and comprising a match value for its corresponding n-gram, a description of its match value, and a score. The methods still further include selecting a subset of the annotations.

15 Claims, 4 Drawing Sheets

ANALYZING UNIFORM RESOURCE LOCATORS

BACKGROUND

Users browse the Internet for various content. Information about the browsing history of a user may be useful in enhancing the user's experience.

DETAILED DESCRIPTION

Analyzing Uniform Resource Locators (URLs) that a user has visited can be useful in gaining insights into users, building user profiles and generating personalized recommendations. Analyzing URLs that a user has requested to be printed may be even more informative. Various implementations provide a light-weight method for generating semantic annotations that can, for example, describe a URL based on a pre-specified taxonomy and a set of scored patterns. These annotations can be used to describe the content and type of a URL, and to classify a web page under multiple possible categories and topics by looking at the URL without requiring access to the actual web-page content. Such methods can be fast compared to web-page content-based classification schemes as no access to the content is necessary. As a result, they can be utilized for real-time analysis of URLs, and for generating swift, contextual recommendations. Such methods are also non-obtrusive, and can be used to determine early whether further processing may be desired.

Various implementations provide tangible advantages over web-page content-based classification schemes. For example, where the content of the web page may have expired or changed since the user accessed it, such as a URL that points to a web page that contains information about a trip reservation made by the user, methods described herein may still provide a basis for classification. Such methods may further provide a basis for classification where the web page may not lend itself to text processing methods, such as a web page that contains only images. Furthermore, methods described herein may provide classification where the content of the web page is private or personal, such as a web page containing information about a user's financial account, email account, medical records, etc., without intruding upon a user's privacy.

Figure 1:
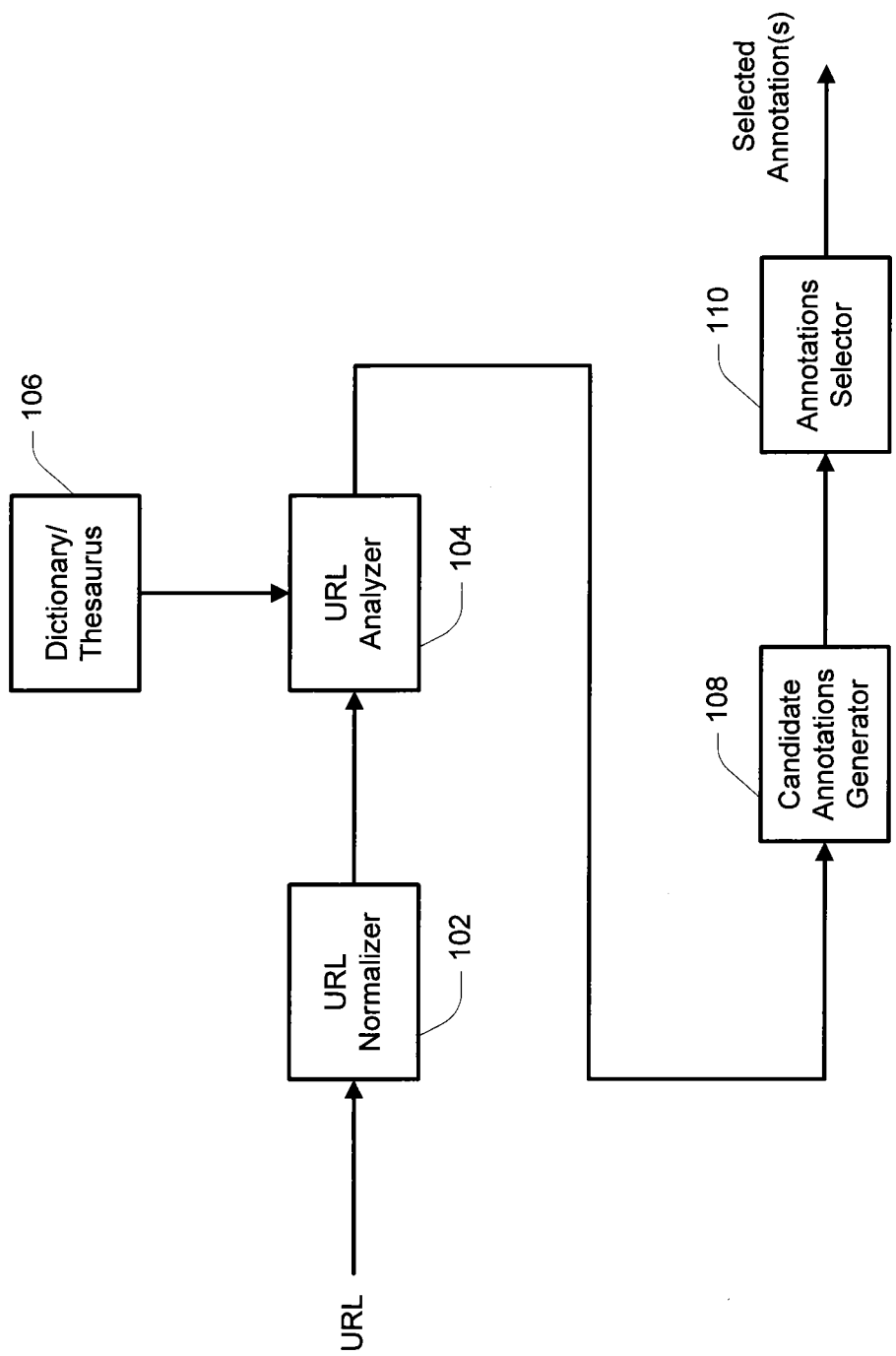
FIG. 1 is a process flow for analyzing a URL in accordance with an example implementation.

FIG. 1 is a process flow for analyzing a URL in accordance with an example implementation. In FIG. 1, a URL is input to a URL normalizer 102. For some implementations, the process flow of FIG. 1 may be initiated in response to a user visiting a web page, e.g., a user viewing the web page in an Internet browser instantiated and displayed on a computer by typing the URL into the browser address bar, or selecting a hyperlink from another web page or another portion of the same web page. For some implementations, the process flow of FIG. 1 may be initiated in response to a user printing a web page, e.g., a user selecting to print a web page viewed in an Internet browser instantiated and displayed on a computer. In either case, the URL may be obtained from the Internet browser instantiation as input to the URL normalizer 102.

Various printable ASCII characters can have designated meanings within a URL. For example, a "?" may indicate the beginning of parameter values for the URL, a "/" may indicate a directory or subdirectory, a "#" may indicate a bookmark, a "&" may separate parameters within the URL, etc. Certain non-alphanumeric characters of a URL are often encoded within the URL to distinguish from these special meanings. Generally, these special characters are encoded in the form, "% xx" where xx is the hexadecimal value of their corresponding printable character. The URL normalizer 102 may restore these special characters to their corresponding printable characters, e.g., replacing "%20" with a space (" "), replacing "%24" with a hash sign ("#"), replacing "%2C" with a comma (","), replacing "%2E" with a period ("."), replacing "%40" with an ampersat ("@"), etc. In addition, the URL normalizer 102 may replace plus signs ("+") with spaces.

The URL analyzer 104 may take the normalized URL and parse it into text segments. The URL analyzer 104 may further maintain a hierarchy of these text segments. For example, the URL could be parsed first by directory level, i.e., using the forward slash ("/") as a designator to begin and/or end a text segment, then each directory level may be further parsed in response to one or more non-alphanumeric characters, e.g., defining text segments as those character strings between non-alphanumeric characters, such as ampersands ("&"), equal signs ("="), question marks ("?"), etc. For some implementations, certain characters, such as spaces, hyphens, commas and periods, may be contained within a given text segment, i.e., no parsing would be performed in response to these characters for that text segment. Parsing could also be performed in response to alphanumeric characters. For example, a transition from a numeric character to an alpha character might be used to indicate a parsing location. Other parsing criteria could also be used. Query strings may be parsed as text segment pairs, where a query string parameter becomes one text segment of the text segment pair and its corresponding value becomes the other text segment of the text segment pair. For example, consider the URL:

http://movies.[sitename].com/showtimes-tickets/all/?location=Columbia %2C+MD&date=20130118

This URL might be parsed as text segments "movies" and "[sitename].com" for a first directory level, "showtimes and tickets" for a second directory level, and "all" for a third directory level. The query string in the final directory level may be parsed into the text string pairs, "location" and "Columbia, Md." as a first text string pair, and "date" and "20130118" as a second text string pair. Although the URL normalizer 102 and the URL analyzer 104 are shown as two separate modules, their functions could be combined, e.g., replacing special characters could be performed concurrently with (e.g., be a function of) parsing, as in the foregoing example.

After parsing the URL into text segments, the URL analyzer 104 may further generate n-grams including not only the text segments, but possible variations of these text segments, such as plural or singular forms of the text segments, and synonyms of the text segments. For example, where "car" is the text segment, the URL analyzer 104 may generate the following n-grams: car, cars, vehicle, vehicles, auto, autos, automobile, etc. The URL analyzer 104 may access one or more knowledge bases, such as a dictionary and/or thesaurus 106, to generate one or more additional n-grams corresponding to a given text segment. The dictionary and/or thesaurus 106 represents a knowledge base (e.g., database) stored on non-transitory computer-usable storage media and containing words and associated synonyms.

Upon generating the n-grams from the text segments, the candidate annotations generator 108 may access one or more knowledge bases (not shown in FIG. 1) and generate annotations corresponding to one or more of the n-grams. The annotations corresponding to an n-gram might be of the form:

$$t \rightarrow <\text{match: type, score}>$$

where:
t=the corresponding n-gram
    match=text string or pattern (i.e., match value) from a knowledge base matching the corresponding n-gram
    type=description (e.g., classifications, categories, attributes or other metadata) of the match value
    score=value indicating relative confidence level that the corresponding n-gram should be associated with the description The candidate annotations generator 108 attempts to match the input set of n-grams against possible match values (i.e., text strings or patterns), and assigns scores for the descriptions associated with possible match values deemed to match, to at least some degree, a corresponding n-gram. The candidate annotations generator 108 will be described in more detail with reference to FIG. 2.

The annotations selector 110 selects a subset of the generated annotations. The annotations selector 110 may select those annotations deemed to most likely describe the URL accurately. For example, the annotations selector 110 may select a particular number of the annotations having the highest scores of all the annotations, or a particular percentage of the annotations having the highest scores of all the annotations. Alternatively, the annotations selector 110 may select those annotations having scores above a particular threshold value. For other implementations, the annotations selector 110 may select annotations in response to which descriptions occur most frequently among the annotations. The selection policies might be applied individually for portions of the URL, e.g., for each hierarchical level, or they might be applied for the URL as a whole. Individual hierarchical levels might use different selection policies. Other policies for selection of annotations may be specified.

Figure 2:
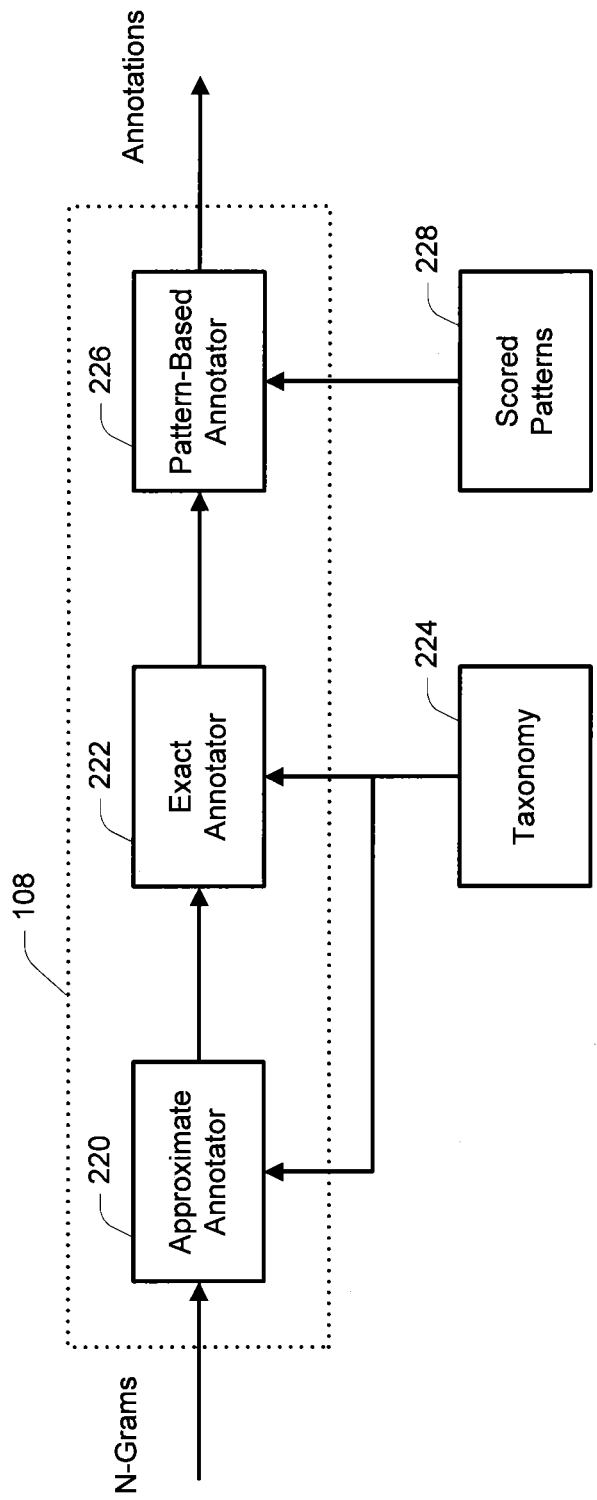
FIG. 2 is a representation of a candidate annotations generator of FIG. 1 in accordance with an example implementation

FIG. 2 is a representation of a candidate annotations generator 110 in accordance with an example implementation. The candidate annotations generator 110 may contain one or more components to generate annotations based on different criteria. For example, the candidate annotations generator 110 may include an approximate annotator 220, an exact annotator 222, and a pattern-based annotator 226.

Figure 3:
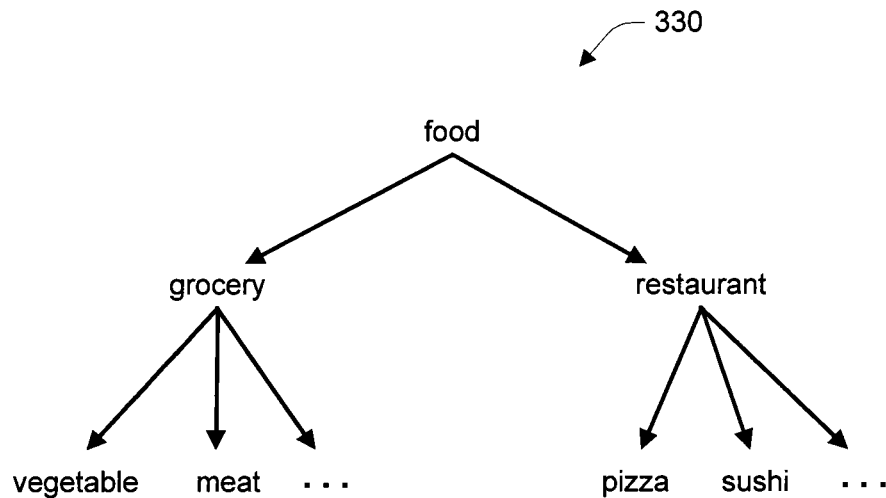
FIG. 3 represents a simple example taxonomy in accordance with an example implementation.

The approximate annotator 220 may seek to match an input n-gram, at least in part, to a text string from a taxonomy 224. The taxonomy 224 represents a knowledge base (e.g., database) stored on non-transitory computer-usable storage media and containing a plurality of text strings, and descriptions (e.g., classifications, categories, attributes or other metadata) corresponding to each of the plurality of text strings. FIG. 3 represents a simple example taxonomy 330 in accordance with an example implementation. In the example taxonomy 330, the text string, "pizza" might have a description of restaurant food, while the text string, "vegetable" might have a description of grocery food. Knowledge bases useful in serving as, or providing input to creating, a taxonomy might include Wordnet, DBPedia or Freebase.

The approximate annotator 220 may find more than one match value for a single n-gram. For some implementations, the approximate annotator 220 may keep a match value only if there is no match value deemed to be better. For example, while "cart" matches both "car" and "cart", the approximate annotator 220 may keep only the latter match value since "car" is a substring of "cart". Alternatively, a decision for retention could be handled through scoring, as described below. For each retained match value for a given n-gram, the description from the taxonomy is retrieved for use in generating a corresponding annotation.

The score for an annotation is computed as a relative indicator of how closely the n-gram matches its corresponding match value. For example, the score may be computed according to how much of t is covered by match and in what position match is found. The intuition behind this score computation may be that if no real word can be combined with match to generate t, then the score should be low. Below is an example score computation in accordance with such an implementation:

search_pos=the last position in t covered by match
    penalty=1.0; //initially penalty is set to maximum
    benefit=1.0; //initially benefit is set to maximum
    if ((t.size−search_pos==1) && (match is not the plural form of t))
        penalty=penalty*0.5;
    if ((search_pos−match.size>0) && (search_pos−match.size<3))
        penalty=penalty*0.7;
    else if ((match.size>3) && (t.size−match.size>3))
        benefit=((t.size+match.size)/t.size);
    score=match.size/t.size*penalty*benefit;

The exact annotator 222 may seek to match an input n-gram, in whole, to a text string from a taxonomy 224. While the approximate annotator 220 and the exact annotator 222 are depicted in FIG. 2 to use the same taxonomy 224, each may use a separate taxonomy. The score for an annotation generated by the exact annotator 222 may be greater than or equal to scores for annotations generated by the approximate annotator 220, e.g., to indicate a higher confidence in an exact match versus an approximate (i.e., not exact) match. For example, annotations generated by the exact annotator 222 may each receive a score of 1.0, while scores of the approximate annotator 220 may have a maximum of 1.0.

For some implementations, certain text strings of a taxonomy 224 may be designated for use only with the exact annotator 222. For example, for entities like country codes, state names, state codes, airport codes, etc., using the approximate annotator 220 that will seek variations may generate many false positives. Where the approximate annotator 220 and the exact annotator 222 use the same taxonomy 224, such items within the taxonomy 224 may be marked (e.g., flagged) to designate their use only for the exact annotator 222, such that the approximate annotator 220 would not evaluate them against an n-gram. Note that remaining items in the taxonomy 224 may be used by both the approximate annotator 220 and the exact annotator 222. As such, a given n-gram may have multiple annotations generated, e.g., one by the approximate annotator 220 and one by the exact annotator 222. Where the approximate annotator 220 and the exact annotator 222 use separate taxonomies, items for use only with the exact annotator 222 would simply not be included in the taxonomy for the approximate annotator 220.

The pattern-based annotator 226 may seek to match an input n-gram to a pattern from scored patterns 228. Scored patterns 228 represents a knowledge base (e.g., database) stored on non-transitory computer-usable storage media and containing pattern rules and corresponding scores for each pattern rule. The pattern-based annotator 226 uses the scored patterns 228 to generate annotations that can be found using rules, such as dates, addresses, etc. For example, the annotation might be "date" if the pattern identifies dates, or "address" if the pattern identifies addresses. As with the other annotators, the score corresponding to a given pattern may be indicative of the confidence in the pattern to identify its corresponding annotation. For example, consider the following example patterns associated with the annotation "date":

MMDDYYYY—where MM is an integer value from 01 to 12, DD is an integer value from 01 to 31, and YYYY is an integer value from 0000 to 3000

MM/DD/YYYY—where MM is an integer value from 01 to 12, DD is an integer value from 01 to 31, and YYYY is an integer value from 0000 to 3000

The second pattern, i.e., MM/DD/YYYY, might be given a higher score as a text string matching the second pattern might be considered more likely to correctly represent a date than a text string matching the first pattern. For example, the text string "12012013" might simply represent a numeric value, while the text string "12/01/2013" would be less likely to simply represent a numeric value.

Figure 4:
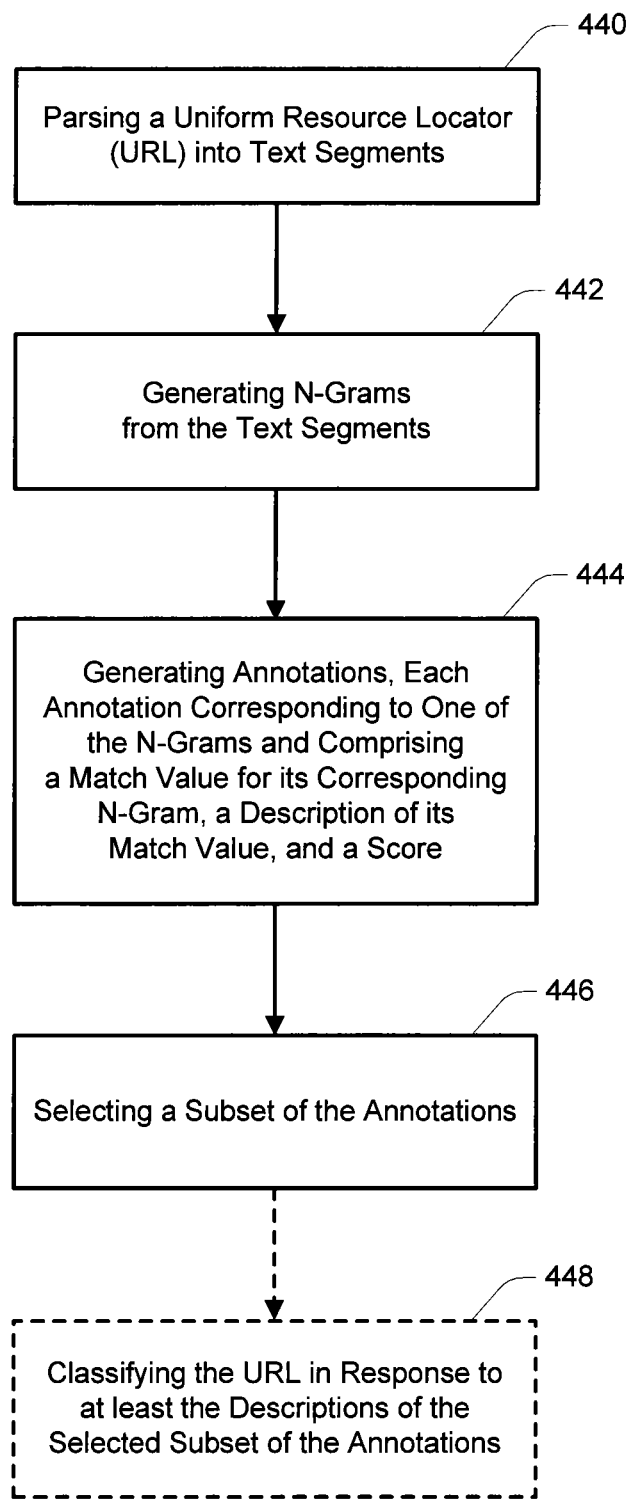
FIG. 4 is a flowchart of a method of analyzing a URL in accordance with an example implementation.

FIG. 4 is a flowchart of a method of analyzing a URL in accordance with an example implementation. At 440, the URL is parsed into text segments, and at 442, n-grams are generated from the text segments, such as was described with reference to the URL analyzer 104. At 444, annotations are generated, such as described with reference to the candidate annotations generator 108. Each annotation corresponds to one of the n-grams, and comprises a match value for its corresponding n-gram, a description of its match value, and a score. For example, the match value may be a text string from a taxonomy, or a pattern from a set of scored patterns. At 446, a subset of the annotations are selected, such as described with reference to the annotations selector 110. Optionally, the URL is then classified at 448 in response to at least the descriptions of the selected subset of the annotations.

It will be appreciated that implementations of the present disclosure can be instantiated by machine-readable instructions, e.g., software, configured to cause a processor to perform methods disclosed herein. The machine-readable instructions can be stored on non-transitory computer-usable storage media in the form of volatile or non-volatile storage. Examples of such storage media include solid-state memory (e.g., Read-Only Memory (ROM), Random-Access Memory (RAM), Flash memory, etc.); optical media (e.g., CD, DVD, Blu-Ray™ disks, etc.); magnetic media (e.g., magnetic disks and disk drives, magnetic tape, etc.); and other non-transitory storage media capable of storing data for subsequent retrieval. Such storage media includes storage media as a component part of a computer system, storage media that is removable from a computer system, and storage media that is accessible to the computer system through a network, such as LAN (local area network), WAN (wide area network), Internet, etc., whether network access is available through wired connections or wireless connections.

Figure 5:
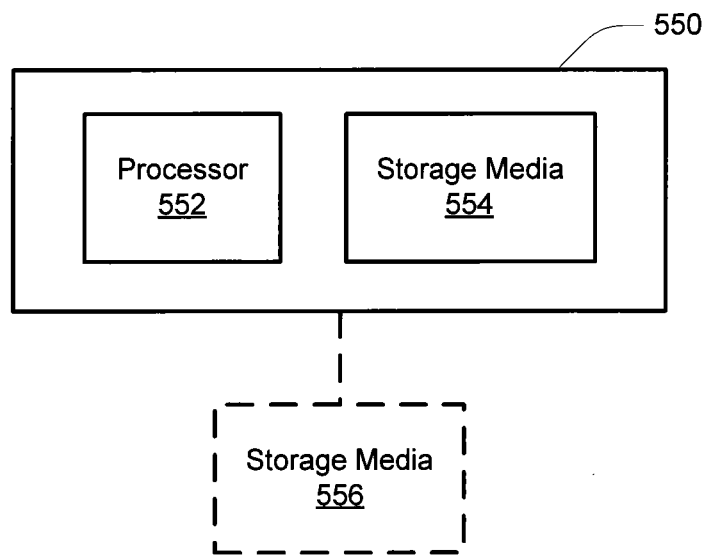
FIG. 5 is a block diagram of an example of a computer system for use with various example implementations.

FIG. 5 is a block diagram of an example of a computer system 550 having a processor 552 and a computer-usable non-transitory storage media 554 in communication with the processor 552 for use with various example implementations. The storage media 554, whether removable from, a component part of, or accessible to computer system 550, includes a non-transitory storage medium having machine-readable instructions stored thereon configured to cause the processor 552 to perform methods disclosed herein. The knowledge bases (e.g., dictionary/thesaurus 106, taxonomy 224 and scored patterns 228) may further be stored on the storage media 554. Storage media 554 may include more than one non-transitory storage medium, and more than one type of non-transitory storage medium. As one example, storage media 554 might include a local hard drive containing the machine-readable instructions, a network-accessible memory containing a dictionary and/or thesaurus, another network-accessible memory containing a taxonomy, and still another network-accessible memory containing a set of scored patterns.

The computer system 550 may further be in communication with a computer-usable non-transitory storage media 556. The storage media 556 may include at least one storage media (e.g., removable or network-accessible storage media) storing the machine-readable instructions configured to cause the processor 552 to perform methods disclosed herein as part of an installation package to store the machine-readable instructions to storage media 554.

What is claimed is:

1. A method of analyzing a Uniform Resource Locator (URL), comprising:
   obtaining the URL from an Internet browser instantiated and displayed on a computer; and
   performing, by a processor:
   parsing the URL into text segments;
   generating n-grams from the text segments of the URL;
   comparing the n-grams generated from the text segments of the URL to at least one knowledge base;
   generating annotations, each annotation corresponding to one of the n-grams generated from the text segments of the URL and comprising a match value for its corresponding n-gram determined from the comparison to the at least one knowledge base, a description of its match value from the at least one knowledge base, and a score indicating a relative confidence level that an association between the corresponding n-gram and the description of its match value is correct; and
   selecting a subset of the annotations.

2. The method of claim 1, wherein generating annotations comprises generating annotations for less than all of the n-grams generated from the text segments of the URL.

3. The method of claim 1, wherein generating annotations comprises generating more than one annotation corresponding to a given n-gram.

4. The method of claim 1, wherein generating annotations comprises generating annotations in response to at least one of an exact match between a match value and an n-gram, an approximate match between a match value and an n-gram, and a pattern match between a match value and an n-gram.

5. The method of claim 1, further comprising:
   replacing special characters of the URL with corresponding printable characters concurrently with or prior to parsing.

6. The method of claim 1, wherein parsing the URL into text segments comprises parsing the URL in response to non-alphanumeric characters of the URL.

7. The method of claim 6, wherein generating n-grams from the text segments of the URL further comprises generating n-gram pairs in response to portions of the text segments of the URL being separated by a non-alphanumeric character indicative of a parameter value assignment.

8. The method of claim 1, further comprising classifying the URL in response to at least the descriptions of the selected subset of the annotations.

9. The method of claim 8, wherein generating n-grams from the text segments of the URL comprises generating a hierarchy of n-grams from the text segments of the URL, and wherein classifying the URL in response to at least the descriptions of the selected subset of the annotations comprises classifying the URL in response to at least the descriptions of the selected subset of the annotations and the hierarchy of their corresponding n-grams.

10. A method of analyzing a Uniform Resource Locator (URL), comprising:
   obtaining the URL from an Internet browser instantiated and displayed on a computer: and performing, by a processor:
   parsing the URL into text segments; generating n-grams from the text segments;
   generating annotations, each annotation corresponding to one of the n-grams and comprising a match value for its corresponding n-gram, a description of its match value, and a score indicating a relative confidence level that an association between the corresponding n-gram and the description of its match value is correct; and
   selecting a subset of the annotations;
   wherein selecting a subset of the annotations comprises a selection policy selected from a group consisting of selecting a particular number of the annotations having the highest scores of all the annotations, selecting a particular percentage of the annotations having the highest scores of all the annotations, selecting those annotations having scores above a particular threshold value, and selecting annotations in response to which descriptions occur most frequently among the annotations.

11. The method of claim 1, wherein generating annotations comprises accessing a non-transitory computer readable media containing a taxonomy comprising a plurality of text strings, and descriptions corresponding to each of the plurality of text strings.

12. The method of claim 1, wherein generating annotations comprises accessing a non-transitory computer readable media containing a plurality of patterns and scores corresponding to each of the plurality of patterns.

13. The method of claim 1, wherein parsing the URL into text segments is performed in response to at least one of viewing a web page corresponding to the URL and requesting to print the web page corresponding to the URL.

14. A non-transitory computer-usable storage media having machine-readable instructions stored thereon and configured to cause a processor to perform a method of any of claims 1-13.

15. The non-transitory computer-usable storage media of claim 14, wherein the non-transitory computer-usable storage media stores the machine-readable instructions as part of an installation package to store the machine-readable instructions to another non-transitory computer-usable storage media in communication with the processor.

* * * * *